Patented Nov. 25, 1952

2,618,900

UNITED STATES PATENT OFFICE 2,618,900

PRODUCTION OF MUSHROOM MYCELIUM

Harry Humfeld, Orinda, Calif., assignor to the United States of America as represented by the Secretary of Agriculture No Drawing. Application September 12, 1950, Serial No. 184,511

8 Claims. (Cl. 47—1.1)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This application is a continuation-in-part of my prior application for patent Serial No. 4,056, filed Jan. 23, 1948.

This invention relates to the production of mushroom mycelium, a foodstuff, by culturing on suitable media, particularly under aerated, agitated, submerged conditions.

In my prior application referred to above, I have disclosed the production of mushroom mycelium on various media particularly media derived from agricultural wastes such as citrus waste, pear waste, asparagus waste, and so forth. I have now found that superior results from the standpoint of yield, flavor and/or nutritive value can be obtained by suitable control of the medium upon which the mycelium is grown and by control of the conditions of the culture.

One aspect of this invention concerns the production of mycelium having a strong, typical mushroom flavor. Briefly described, this end is achieved by culturing the mycelium until the sugar (or other carbohydrate source) in the medium is substantially completely assimilated and then aging the culture by continuing the incubation or simply storing the entire culture to allow certain enzymic reactions to take place whereby the mycelium develops a strong, typical mushroom flavor. Thus whereas the mycelium produced at the time when the sugar is all used up is essentially bland or weak in taste, as the aging continues a good flavor is developed in the mycelium.

A further aspect of this invention concerns increasing the nutritive value of the mycelium. Briefly described, I have found that the nitrogen content of the mycelium can be increased by suitable increase in the nitrogen available in the medium. This assimilated nitrogen is present in the mycelium as proteins or other organic compounds and thus increases the food value of the mycelium. I have also found that the increased nitrogen concentration in the medium greatly accelerates the development of a full-flavored mycelium.

Another aspect of the invention is that I have found that urea serves as an exceptionally desirable source of nitrogen for the culture of the mycelium. Thus urea is rapidly and completely assimilated by the mushroom organism and further it is assimilated in such fashion that the pH of the medium is not greatly altered during the course of the culture. Another point is that the assimilation of urea is complete and there are no byproducts produced which might adversely affect the flavor of the mycelium.

Another aspect of this invention concerns the control of bitterness in the mycelium. I have found that the content of certain inorganic nutrients (particularly phosphorus, potassium, magnesium, and sulphur) in the medium is critical within certain limits and that if the concentration of these inorganic nutrients is excessively high, the mycelium produced tends to develop a bitter taste. I have found that by limiting the concentration of these nutrients so that it does not greatly exceed the concentration required for the growth of the organism, the mycelium is free from bitterness.

Another aspect of this invention concerns the control of the nutritive elements present in the medium whereby to attain the most efficient production of the mycelium.

Further objects and advantages of this invention will be obvious from the description herein.

With regard to development of a typical mushroom flavor, noted briefly above, several points are to be considered. The first is that the culturing of the mycelium does not necessarily lead to production of a full-flavored mycelium. Thus if the culture is carried out only until the carbohydrate source is partly or even entirely assimilated the mycelium will have a weak or even a bland flavor. Hence if one's aim is essentially to prepare mycelium for use as a protein source in foods or feeds where the mushroom taste is not needed then one may conduct the culture only to the point where the carbohydrate is used up. To ensure a bland product one would preferably stop the culture at the point when, say, 80 to 100% of the sugar has been assimilated. On the other hand, if the aim is to produce a strongly flavored product such as will retain a typical mushroom flavor when diluted as in preparing soups or gravies then the culture must be adequately aged. This aging can be carried out in many ways. For example, the incubation can simply be allowed to continue under the agitated, aerated conditions under which the mycelium is grown. Usually, however, the aging is more rapid and efficient if the entire culture is removed from the fermentor and placed in a vessel and allowed to stand at a temperature suitable for enzymic action, say about 20° C. to about 35° C., usually room temperature (25° C.) for convenience. If this type of aging is used, the culture should of course be first continued long enough to ensure full growth of the cells and complete utilization of the carbohydrate source since little if any growth can take place during quiescent storage. The time required in any particular case to develop the flavor depends on many factors, such as temperature, intensity of flavor desired, strain or variety of mushroom, and so on. In any particular case, the proper time can easily be determined by sampling the culture under aging and noting the taste of the mycelium. In most cases the flavor reaches its maximum in about 12 to about 72 hours after the carbohydrate is entirely assimilated. In many cases the peak of flavor is reached in about 48 hours and further aging serves no useful purpose. In any case, the aging is carried out on the culture in its complete or virtually complete state. That is, if the mycelium is centrifuged out of the culture and allowed to stand little or no development of flavor will take place. The effect of aging on the development of flavor is more specifically demonstrated in Examples I and II, below.

With regard to increasing the nutritive value of the mycelium, I have found that in order to obtain full growth of the mycelium and complete assimilation of the carbohydrate source in the medium, a certain threshold concentration of nitrogen must be present in the medium. This threshold concentration will be essentially the same for any compound used as the source of nitrogen since in all cases the nitrogen content is the critical factor. Thus I have found that for each percent of carbohydrate in the medium there is required approximately 100 p. p. m. of nitrogen for obtaining maximum mycelial growth. (The abbreviation "p. p. m." used herein means parts per million.) However, if the concentration of nitrogen is considerably increased above this threshold concentration, the nitrogen content and hence the nutritive value of the mycelium is greatly increased. Thus for producing mycelium of high nutritive value, I use a nitrogen concentration of from about 200 to about 600 p. p. m. for each percent of carbohydrate in the medium. In most cases, a nitrogen concentration from about 300 to about 500 p. p. m. for each percent of carbohydrate will supply sufficient nitrogen for production of mycelium of maximum nitrogen content. Another factor to be considered is that I have found that increasing the nitrogen concentration of the medium above the threshold level accelerates the development of a typical mushroom flavor in the mycelium. Thus when the aforesaid threshold concentration of nitrogen is used, the mycelium develops a strong flavor very slowly, often requiring an aging period of more than 72 hours. On the other hand, when the nitrogen concentration is increased, flavor develops much more rapidly and if, for instance, the nitrogen concentration is raised to 400 p. p. m. for each percent of carbohydrate, a strong mushroom flavor is developed in 24 hours of aging, or less. Thus in order to produce mycelium of high nutritive value and to accelerate the development of a typical mushroom flavor in the mycelium, I use a nitrogen concentration in the medium of from about 200 p. p. m. to about 600 p. p. m. for each percent of carbohydrate in the medium. In most instances a nitrogen concentration of from about 300 to about 500 p. p. m. for each percent of carbohydrate will be adequate for formation of mycelium of high nutritive value and for accelerating flavor development. The effect of nitrogen concentration is more specifically demonstrated in Examples III and IV herein.

As disclosed in my prior application, the mushroom mycelium, the vegetative portion of the mushroom plant, is a valuable foodstuff and tastes like the fruiting body of the mushroom plant. Thus, a typical lot of the mycelium of *Agaricus campestris* produced in accordance with this invention had the following composition, on a dry basis:

| | | |
|---|---|---|
| Protein (N×6.25) | percent | 35.5 |
| Fat (ether sol. extract) | do | 3.3 |
| Carbohydrates | do | 48.8 |
| Fiber | do | 6.92 |
| Ash | do | 4.59 |
| Calcium | do | 0.12 |
| Phosphorus | do | 1.28 |
| Thiamin | micrograms/gram | 8.7 |
| Riboflavin | do | 47 |
| Niacin | do | 190 |

The mycelium may be used directly as a food or may be used in preparing other dishes such as gravies, soups, sauces, and so forth. It may be advantageously employed as a flavoring agent for meats and other foods. Further, since the culture of the mycelium requires only the use of low-cost raw materials, the mycelium can be produced at low cost to be used as an animal feed or feed supplement particularly since it is rich in protein and contains essential vitamins.

The culture of the mushroom mycelium may be carried out in a number of alternative ways. For example, the organism may be cultured by a shake technique wherein the inoculated medium is placed in flasks which are subjected to continuous shaking so as to obtain constant exposure of the medium to air. However, it is to be noted that such a technique is desirable only for laboratory experiments as growth of the mycelium is comparatively slow under such conditions. For practical purposes, an aerated, agitated submerged type of culture is preferred as giving high yields in a short period of time resulting therefore in efficiency and economy of operation. In carrying out such type of culture, the sterilized medium is placed in a vessel, inoculated with a culture of the mushroom organism and then air is continuously forced into the inoculated medium beneath the surface thereof while it is subjected to agitation. Under such circumstances, the cells are dispersed throughout the medium and are kept in intimate contact with the air and with the nutrients present in the medium.

In carrying out the process of this invention under the preferred technique of submerged conditions, many types of apparatus can be used. The essentials to be provided are a vessel equipped with a stirring device and means for introducing sterile air during the run and usually means for heating or cooling the contents of the vessel. Many refinements may be added such as thermometers, sampling devices, inlets for introducing materials, mechanical foam breakers, and so forth. It is preferably to employ some stirring or agitating device to disperse the air entering the system into the medium. Such device may be a mechanical agitator such as a propeller or turbine-type agitator, for example. Further, it is possible to utilize the air entering the system for agitation as well as for the metabolism of the organism. For this purpose, air may be introduced through orifices whereby turbulence of the culture will be obtained. Another method of providing agitation is to continuously circulate the culture medium through a pump. In such case the air may be introduced directly into the pump or into the pump line whereby it will be thoroughly dispersed with the culture medium by the mixing action of the pump.

During submerged culture, excessive foaming is sometimes encountered. This can be controlled by adding a chemical de-foaming agent or by mechanical devices. Commercial deforming agents suitable for this purpose are available on the market. A suitable example is a monoglyceride dissolved in lard oil; another is octadecanol, which, for convenience in adding small quantities thereof, may be diluted with purified mineral (liquid petrolatum) or lard oil. Mechanical foam breakers such as disclosed by Humfeld (Jour. Bacteriology, vol. 54, p. 689) may be used instead of chemical means.

In culturing the mushroom mycelium by any technique, air must be made available thus to provide aerobic conditions for growth. In culturing under submerged conditions, air must be deliberately introduced into the culture. It is most convenient to introduce the air through a sparger or other mechanical device to break up the air into fine bubbles. Usually an excess of air is used to make sure that the organism is adequately provided with this essential agent and to remove carbon dioxide from the culture. Thus I usually introduce air at the rate of from about 0.5 to about 3 volumes, preferably about 1 volume, per minute per volume of medium.

During the submerged culture, the rate of growth can be followed, if desired by noting the volume of cells in the culture. This can readily be accomplished by withdrawing small samples of the culture and centrifuging them whereby the cellular material will settle to the bottom of the centrifuge tube and the ratio of cellular material (mycelium) to liquid can be readily ascertained. For control of flavor it is desirable to know when maximum growth has been reached so that the mycelium can be harvested at this point or aged if flavor enhancement is sought. Thus by determining the cell volume from time to time, the point when maximum mycelium production is reached can easily be determined. Another method of following the course of the incubation is to determine the refractive index of the culture liquid from time to time. In this way the concentration of sugar in the medium can be estimated and when the concentration of sugar reaches zero, or virtually that, then it is evident that maximum mycelium production has been attained. Another method of following the rate of growth involves measuring the pH of the culture from time to time. The point is that when the carbohydrate source is completely assimilated, the pH of the culture will start to rise due to autolysis of the mycelium. Thus by noting the pH of the culture as the incubation proceeds one can readily determine the point when the carbohydrate is used up, that is, the point when maximum mycelial growth has been reached.

The mushroom mycelium may be cultured in many different media. In essence, the medium must contain, besides water, (1) a carbohydrate as a source of energy, (2) a source of nitrogen, and (3) suitable minerals.

As the carbohydrate one can use any of a large variety of substances, as for example, dextrose, sucrose, galactose, mannose, levulose, maltose, xylose, dextrin, mannitol, sorbitol, glycerol, arabinose, soluble starch, and so forth. Of course, some of these energy sources are more readily utilized than others by the mushroom organism and hence higher yields are produced under otherwise identical conditions. Thus I prefer to use sucrose or dextrose as being low in cost and yet productive of high yields. The effect of different carbohydrates is shown in more detail in Example V, below. The concentration of the energy source should be enough to provide sufficient nutrient for good growth of the organism; in general, concentrations from about 0.5% to about 10% can be used. A carbohydrate concentration of about 5% is preferred because thereby one obtains the most efficient use of the fermentor, in that this concentration of carbohydrate is rapidly assimilated and good growth of mycelium is obtained and also the total amount of mycelium produced is not such as to materially hinder proper aeration of the culture.

Of course, it is not essential to use purified, individual compounds as the source of energy. Thus one may employ corn sugar, corn syrup, invert sugar, beet or cane molasses and other relatively low-cost sources of carbohydrate. Suitable media can also be made by cooking cereals in water and treating the resulting wort with an acid or a diastatic enzyme thus to solubilize the starch or partly or completely convert it into dextrin or sugars and hence render it readily assimilable. Suitable cereals for such purpose are for example, corn, wheat, oats, barley, malted barley, rice and so forth.

From an economic standpoint it is advantageous to utilize media prepared from agricultural wastes. Many of such wastes are available in farming communities especially during canning and packing season. For instance the citrus industry produces enormous volumes of waste material such as orange peels, cull oranges, orange pulp, grapefruit peels, cull grapefruit, grapefruit pulp, and similar wastes from lemons and limes. The pear industry produces waste including peels, culls, and cores. In the canning of asparagus are obtained butts and cull spears. In the growing of melons such as cantaloupes large tonnages of over-ripe and over-size melons are discarded. Apple packers and canners produce quantities of waste including peels, cores, culls, etc. In the same manner, many other wastes are available at low cost, since in most cases the processors are only too glad to get rid of the material. Such wastes contain sugar and some nitrogenous material and mineral salts and thus are admirably adapted for the purpose of this invention. Regardless of what waste is used, it can be easily prepared for use as a medium. To this end the waste is separated from fibrous material to obtain a liquid containing the nutritive elements, the waste being either pressed or subjected to leaching the water. In either case the juice, preferably after clarification, is ready for use. It is essential that the culture medium be made from materials which contain no compounds inhibitory to the growth of the mycelium. The suitability of any particular substrate can easily be determined by running a shake culture on a sample of the contemplated material.

The source of nitrogen may be an organic or inorganic nitrogen derivative. In the organic category may be mentioned proteins, hydrolyzed proteins, enzyme-digested proteins, amino acids, yeast extract, gluten, urea, and so forth. In the inorganic category, one can use ammonia or the ammonium salts, such as ammonium phosphate, ammonium citrate, ammonium acetate, ammonium sulphate, ammonium nitrate, and so forth. In general the concentration of nitrogen in the medium should be from about 100 p. p. m. to about 600 p. p. m. for each percent of carbohydrate. No deleterious effect is caused by adding higher concentrations of nitrogen, the excess simply is not assimilated. The effect of nitrogen concentration on nutritive value and flavor of the mycelium is discussed above and demonstrated in Examples III and IV. One convenient way of supplying nitrogen to the medium is to add ammonium hydroxide or ammonia gas periodically during the course of the incubation. In this way the pH of the culture can be kept constant and the requisite nitrogen be supplied. My preferred nitrogen source is urea for the reasons that urea is relatively low in price and even more important, assimilation of urea by the mushroom organism does not adversely affect the pH of the media. Thus all the urea required for the incubation may be initially added to the medium and as this urea is used up the pH of the medium will remain within the desirable range. This action is to be contrasted with the action of most ammonium salts in which case assimilation of the ammonia of the salt results in continuing decrease in the pH of the medium. The fact that urea is assimilable by the mushroom organism and the fact that the pH remains within the desirable range as the urea is used up are both unexpected results. Thus many microorganisms cannot assimilate urea and most of those which can assimilate it break down the urea to ammonia so rapidly that the medium becomes so highly alkaline that growth of the organism is checked.

In addition to the energy and nitrogen sources, mineral nutrients are required for the medium. Thus phosphorus, potassium, sulphur, magnesium, calcium, iron, manganese, zinc, copper, and cobalt are required in small proportion. These elements are supplied in the form of their salts. Thus the metallic elements are supplied as their chlorides, sulphates, phosphates, citrates, acetates, or the like. Sulphur and phosphorus are supplied in the form of sulphates or phosphates, for example, the alkali metal or ammonium sulphates or phosphates. The necessary proportions of these elements are as follows:

Of the mineral nutrients, phosphorus and potassium are required in largest proportion thus the medium should be supplied with each of these in a concentration from about 10 to about 100 p. p. m. for each percent of carbohydrate. In order to attain maximum mycelial growth, the concentration of each should be at least 20 p. p. m. for each percent of carbohydrate. Although concentrations can be greatly increased above this level without deleterious effect on the yield of mycelium, we generally avoid the use of too high concentrations as excessive unassimilated phosphorus and potassium tends to yield a mycelium with a bitter flavor. For this reason then I prefer to limit the concentration of each of these elements to the range from about 20 to about 50 p. p. m. for each percent of carbohydrate. In this range, a sufficient quantity of each element is provided for maximum mycelial growth yet the amount is limited so that the resulting mycelium is not bitter.

Sulphur, magnesium, and calcium should be present in the medium each in a concentration from about 0.5 to about 50 p. p. m. for each percent of carbohydrate. For maximum yield of mycelium, the concentrations should be:

Sulphur—at least about 5 p. p. m. for each percent of carbohydrate.

Magnesium—at least about 2 p. p. m. for each percent of carbohydrate.

Calcium—at least about 1 p. p. m. for each percent of carbohydrate.

I also have found that it is preferable to limit the concentrations of sulphur and magnesium in order to prevent development of a bitter mycelium. Thus in general, I prefer to employ a sulphur concentration of from about 5 to about 20 p. p. m. for each percent of carbohydrate and a magnesium concentration of from about 2 to about 10 p. p. m. for each percent of carbohydrate. By using these preferred ranges a sufficient quantity of each element is provided for maximum growth yet the amount of each is so limited that mycelium is not bitter in taste.

The elements iron, manganese, zinc, copper, and cobalt are required only in very minute quantities, i. e., about from 0.1 to 1 p. p. m. for each percent of carbohydrate. These elements are required only in traces and the impurities in the ingredients of the medium usually contain sufficient proportions of them to ensure their presence in proper amount.

In preparing media from thoroughly refined materials it is essential that all the various mineral elements be deliberately added in the requisite proportions. However, where the medium is made from technical grade materials or agricultural wastes, cereals, molasses, corn steep liquor and so on, at least some of the elements will be present as impurities. This is particularly true for the trace elements (Fe, Mn, Zn, Cu, and Co) and in some cases for calcium and magnesium. Even in such cases however, additional quantities of phosphorus, potassium, sulphur, and often magnesium and calcium will be required to provide the concentrations set forth above.

The pH of the culture may be varied over a wide range; growth has been obtained within the range from about 3.3 to about 8.0. However, it is of advantage to carry out the growth at a pH of about 4 to about 5 in order to minimize danger of bacterial contamination. The ordinary types of bacteria which may be present as contaminants will not grow at this pH range. For the proper adjustment of the pH of the medium, any non-toxic, water-soluble basic or acidic material may be used. For instance, to decrease the pH one may use sulphuric acid, hydrochloric acid, acetic acid, phosphoric acid, etc. For increasing the pH, one may employ sodium hydroxide, ammonium hydroxide, sodium bicarbonate, sodium carbonate, etc. Generally, a pH of about 4 to 7 is preferred.

The temperature of growth is not critical over a rather wide temperature range, but generally a temperature from about 25° C. to about 30° C. is preferred. In maintaining proper temperature levels, especially when culturing in large batches, it is usually necessary to heat the system during the early stages of growth whereas as the culture proceeds it will be observed that heat is generated in the culture and cooling will be required to maintain the proper temperature. Thus in working up large batches, it is preferred to use a vessel which is equipped with a jacket or coil into which can be introduced a heating or cooling medium by suitable control of valves. In carrying out small batches on an experimental scale it is most convenient to carry out the incubation at room temperature (25°–30° C.) whereby no heating or cooling devices are required, the temperature of the air in the room being sufficient to maintain essentially constant temperature.

The method of inoculation of the medium and the quantity of inoculum are not critical. The inoculation can be carried on in many ways. One method involves growing a culture of the mushroom mycelium on a wort agar plate. An ordinary mushroom (fruiting body) is sterilized on its surface by an alcohol dip and flaming. Some of the tissue of the mushroom (either spores or fleshy part) is placed on the agar by a stab or scrape technique. After incubating this agar growth at 25° C. until good growth is obtained (about 2 weeks) the colony of mycelium is used to inoculate the sterile medium for the submerged culture. Preferably, however, the colony of mycelium from the agar plate is used to inoculate a small batch of sterile liquid medium and the culturing done in a shaking machine at about 25° C. When good growth is formed, the culture so obtained is used to inoculate larger quantities of sterile medium and further growth is obtained by the shake technique. Finally, this culture is used to inoculate a large sized batch of sterile medium in a fermentor adapted for submerged culture. By building up the concentration of mycelium in this manner more rapid growth is obtained and the large scale equipment is not used until actually necessary. The medium for the submerged culture may also be inoculated by merely adding to it sections of mushroom mycelium. In such case growth will be slower at first than where a mycelium grown in the liquid medium is used for inoculation. The most convenient method of inoculation involves removing a portion of the culture medium from each large scale batch, and preserving it to be used to inoculate the next batch of sterile medium. The culture can be accomplished in a continuous manner if the culture medium is withdrawn periodically and fresh medium is introduced into the fermentor to replace the amount withdrawn.

In order to prevent contamination of the culture by bacteria or yeasts it is essential to sterilize the medium prior to inoculation. This sterilization is accomplished by boiling the medium, by steaming it, or by subjecting it to steam under pressure. If the pH of the medium is 5.5 or less, sterilization can be accomplished satisfactorily by boiling or by passing steam through the material. If the pH is above 5.5, it is advisable to subject the medium to steam under pressure in an autoclave or other pressure-resistant vessel.

The mycelium is recovered from the culture by filtering or preferably by centrifuging and is thus separated as cream-like material. This wet mycelium is preferably washed with water to remove culture medium. It is then ready for use and can be used as a food or as a flavoring for other foods. If the material is to be kept for any length of time, it may be frozen or canned in the same manner as applied to fruits and vegetables. Likewise the wet mycelium may be dehydrated in which condition it keeps well. For this dehydration, any of the customary drying techniques may be employed. Thus the wet mycelium can be subjected to a draft of heated air while the material is on trays or in a rotary kiln. Drum-drying or spray-drying methods may also be employed. Vacuum apparatus with or without heating may be utilized.

The mycelium prepared according to this invention has numerous uses. It can be used directly as a food or as a flavoring agent. For instance soups of distinctive mushroom flavor can be made by cooking the mycelium with water and a small amount of salt and pepper. If a thicker soup is desired milk may be substituted for the water or one may add a thickening agent such as cornstarch, flour, barley, rice, or potatoes. If a meat-mushroom soup is desired one may add some beef stock, meat extract, monosodium glutamate, or hydrolyzed protein. Excellent gravies may be made in the same manner by adding a larger proportion of thickening agent. The dry mycelium may be mixed with dried vegetables such as celery, onions, or parsley together with a thickening agent and spices and compressed into blocks or tablets which may be utilized as a convenient source for soup. If desired the dry mycelium can be used as a flavoring agent and applied to almost every type of food. For instance, the mycelium can be sprinkled on steaks or added to conventional gravies, roasts, stews, etc. The dry mycelium can be mixed with salt and a small amount of an anti-hygroscopic agent to make a mushroom-flavored salt. The dry mycelium can be compressed by the use of suitable molds in the conventional "toadstool" form to make a simulated mushroom (fruiting-body). Although the primary use of the mycelium is as a human food, the product may be used as an animal feed.

Although the examples herein show the growth of Agaricus campestris mycelium, it is obvious that the process can be applied to the culturing of mycelium of other types of edible mushrooms using the aerated, submerged technique.

The expression "mushroom tissue" used herein means any portion of the mushroom organism. Thus the term includes spores, the fleshy part of the fruiting body or mycelium. The mushroom may be any of the known edible varieties.

The following examples demonstrate the invention in greater detail. It is understood that these examples are furnished only by way of illustration and not limitation.

EXAMPLE I

This example illustrates the effect of continuing the incubation after full growth is obtained whereby to obtain mycelium of enhanced flavor.

The medium for the culture had the following composition:

| | |
|---|---|
| Carbohydrate (dextrose) _____percent__ | 5 |
| Nitrogen (supplied as urea) ____p. p. m__ | 2,000 |
| Phosphorus _____p. p. m__ | 250 |
| Potassium _____p. p. m__ | 250 |
| Sulphur _____p. p. m__ | 100 |
| Magnesium _____p. p. m__ | 40 |
| Calcium _____p. p. m__ | 100 |
| Iron _____p. p. m__ | 4 |
| Manganese _____p. p. m__ | 4 |
| Zinc _____p. p. m__ | 2 |
| Copper _____p. p. m__ | 0.5 |

Details as to the preparation of the medium and its use are set forth below:

(A) A medium was prepared containing the ingredients in the proportions listed below:

| | |
|---|---|
| Dextrose _____g__ | 50 |
| $MgHPO_4$ _____g__ | 0.4 |
| $KH_2PO_4$ _____g__ | 0.87 |
| $CaCl_2 \cdot 2H_2O$ _____g__ | 1.35 |
| $H_2SO_4$ (2 normal solution) _____ml__ | 5.7 |
| Water, sufficient to make 1 liter | |

In addition, a mineral salt solution was added to furnish trace elements in the amounts indicated:

| | Parts per million |
|---|---|
| Fe | 4 |
| Mn | 4 |
| Zn | 2 |
| Cu | 0.5 |

Prior to use this medium was adjusted to pH 4.5 by addition of a sodium hydroxide solution. The ingredients used in preparing the medium contained cobalt as an impurity to provide a sufficient concentration of this element.

(B) 150 liters of the medium as above described was placed in a fermentor and sterilized at 120° C. for 30 minutes. The medium was allowed to cool overnight and was inoculated with a culture of *Agaricus campestris* (white variety) and a sterile solution of urea was added in an amount necessary to establish a nitrogen concentration of 2,000 p. p. m. in the medium. The incubation was run at a temperature of approximately 25° C. while introducing air beneath the surface of the culture at the rate of 8 cu. ft. per minute and rotating the agitator at 350 R. P. M. Under these circumstances, the air was thoroughly dispersed into culture thus to obtain agitated, aerated, submerged growth conditions. Samples of the culture were removed from time to time to note the progress of the run.

The following results were obtained:

*Table 1*

| Time, hrs. | Yield of dry mycelium, g./liter | Flavor of mycelium |
|---|---|---|
| 17 | 17.2 | mild. |
| 24 | 30.7 | mild. |
| 43 | 28 | strong. |
| 67 | 24 | strong. |
| 72 | 24.2 | strong. |
| 89 | 22.8 | strong. |

After the 93rd hour the culture was harvested to obtain 36 lbs. of moist mycelium (13.6% solids) having a strong, typical mushroom flavor. By determining the refractive index of the medium at intervals, it was noted that the dextrose was virtually entirely consumed at the 24th hour of culture. However, at this stage of the incubation, the mycelium had only a mild flavor whereas by continuing the incubation, a strong flavor was developed as shown in Table 1.

EXAMPLE II

This example illustrates the effect of continuing the incubation after full growth or storing the entire culture after full growth in order to enhance the flavor of the mycelium.

Two submerged cultures of *Agaricus campestris* (white variety) were run on the same medium and under the same conditions as set forth in Example I. In each case the cultures were run 48 hours at which time full growth had been obtained and all the sugar in the medium had been assimilated.

(1) One of the cultures was allowed to stand at 25° C. with the air supply cut off and the agitator stopped. Samples of the culture were withdrawn from time to time to note the cell volume and to taste the mycelium. The following results were obtained:

*Table 2*

| Time of storage, hrs. | Cell volume, percent [1] | Flavor of mycelium |
|---|---|---|
| 0 | 13 | weak. |
| 24 | 16 | good. |
| 39 | 16 | strong. |
| 46 | 16 | strong. |
| 63 | 16 | strong. |
| 70 | 16 | strong. |
| 87 | 14 | strong. |

[1] Percentage ratio of mycelium cells to total volume of culture.

(2) The other culture was continued at 25° C., with the supply of air being continued and the agitator being rotated as before. Samples of the culture were withdrawn from time to time to note the cell volume and flavor of the mycelium. The following results were obtained:

*Table 3*

| Time of continued incubation, hrs. | Cell volume, percent | Flavor of mycelium |
|---|---|---|
| 0 | 12 | bland. |
| 24 | 12 | bland. |
| 39 | 16 | good. |
| 46 | 16 | strong. |
| 63 | 16 | strong. |
| 70 | 16 | strong. |
| 87 | 14 | strong. |

EXAMPLE III

This example illustrates the effect of increasing nitrogen content in the medium whereby to increase the nutritive value of the mycelium.

A series of shake cultures were carried out using various concentrations of nitrogen in the media (nitrogen source—urea) and conducting the incubations for various periods of time. In each case the composition of the medium was the same as in Example I with the exception that the concentration of nitrogen was varied as indicated below. These shake cultures were conducted at 25° C. using as inocula cultures of *Agaricus campestris* (brown or cream variety). The following results were obtained:

*Table 4 (6 days' incubation)*

| N added to culture, p. p. m. | Yield of dry mycelium, g./l. | Nitrogen content of mycelium, percent |
|---|---|---|
| 500 | 16.8 | 2.74 |
| 1,000 | 19.8 | 5.07 |
| 1,500 | 20.8 | 6.35 |
| 2,000 | 21.2 | 6.75 |
| 2,500 | 20.2 | 7.25 |
| 3,000 | 22.2 | 6.91 |

*Table 5 (7 days' incubation)*

| N added to culture, p. p. m. | Yield of dry mycelium, g./l. | Nitrogen content of mycelium, percent |
|---|---|---|
| 500 | 16.8 | 2.7 |
| 1,000 | 20.9 | 4.63 |
| 1,500 | 20.5 | 6.18 |
| 2,000 | 21.3 | 6.16 |
| 2,500 | 21.1 | 6.21 |
| 3,000 | 21.7 | 6.58 |

*Table 6 (8 days' incubation)*

| N added to culture, p. p. m. | Yield of dry mycelium, g./l. | Nitrogen content of mycelium, percent |
|---|---|---|
| 500 | 19.0 | 2.10 |
| 1,000 | 20.7 | 4.74 |
| 1,500 | 21.1 | 6.00 |
| 2,000 | 20.2 | 6.91 |
| 2,500 | 21.1 | 6.87 |
| 3,000 | 22.8 | 6.84 |

The above data illustrate clearly how increase in nitrogen concentration in the medium causes an increase in the nitrogen content of the mycelium. Thus considering the 8-day incubation, 500 p. p. m. of nitrogen is actually all that is necessary for maximum production of mycelium yet by increasing the nitrogen concentration to 2000 p. p. m., the nitrogen content of the mycelium is raised from about 2% to essentially 7%.

EXAMPLE IV

This example illustrates the effect of increasing nitrogen content in the medium to accelerate development of a full-flavored mycelium.

A series of shake cultures were carried out using various concentrations of nitrogen in the media (nitrogen source: urea). In each case the composition of the medium was as set forth in Example I with the exception that the concentration of nitrogen was varied as indicated below. These shake cultures were conducted at 25° C. using as inocula cultures of *Agaricus campestris* (a white variety). In each case the shake culture was incubated until full growth of mycelium had been obtained (3 days) and each culture was then allowed to age by standing quiescent at 25° C. and the mycelium tasted at intervals. The results obtained are tabulated below:

*Table 7*

| Nitrogen concentration in medium, p. p. m. | Period of aging, hrs. | Flavor of mycelium |
|---|---|---|
| 1,000 | 0 | bland. |
| 1,000 | 24 | bland. |
| 1,000 | 48 | weak. |
| 1,000 | 80 | weak. |
| 1,500 | 0 | fair. |
| 1,500 | 24 | good. |
| 1,500 | 48 | strong. |
| 1,500 | 80 | strong. |
| 2,000 | 0 | good. |
| 2,000 | 24 | strong. |
| 2,000 | 48 | strong. |
| 2,000 | 80 | strong. |
| 2,500 | 0 | good. |
| 2,500 | 24 | strong. |
| 2,500 | 48 | strong. |
| 2,500 | 80 | strong. |

It is evident from the above data that increasing nitrogen concentration speeds the development of a full-flavored mycelium product. Thus for a nitrogen concentration of 1000 p. p. m. (corresponding to 200 p. p. m. N for each percent of carbohydrate), the mycelium was weak in flavor after 80 hours of aging whereas when the nitrogen concentration was doubled, the mycelium developed a strong flavor after 24 hours of aging.

EXAMPLE V

This example illustrates the use of various carbohydrates as sources of energy.

A series of shake cultures were carried out using various carbohydrates as the source of energy in the media. In each case the composition of the media was the same as in Example I with the exception that dextrose (in all but one run) was replaced by the carbohydrate to be tested. In each case the concentration of carbohydrate was 5% (50 grams/liter). These shake cultures were conducted at 25° C. using as inocula cultures of *Agaricus campestris* (white variety). The following results were obtained:

*Table 8*

| Carbohydrate | Yield of dry mycelium, g./l. | | |
|---|---|---|---|
| | 4 days' incubation | 5 days' incubation | 6 days' incubation |
| dextrose | 27 | 21 | 19 |
| d-galactose | 16 | 26 | 20 |
| d-mannose | 26 | 25 | 17 |
| levulose | 19 | 26 | 17 |
| maltose | 20 | 25 | 17 |
| d-xylose | 12 | 19 | 22 |
| dextrin | 19 | 24 | 22 |
| mannitol | 22 | 26 | 26 |
| l-arabinose | 12 | 18 | 20 |
| sucrose | 25 | | 22 |
| soluble starch | 15 | 17 | 22 |

EXAMPLE VI

This example illustrates the effect of phosphorus in the medium on the growth of the mycelium.

A medium was prepared containing water and the following ingredients:

| | | |
|---|---|---|
| Dextrose | per cent | 5 |
| Nitrogen (supplied as urea) | p. p. m. | 2300 |
| Potassium (supplied as KOH) | p. p. m. | 500 |
| Sulphur (supplied as H₂SO₄) | p. p. m. | 100 |
| Magnesium | p. p. m. | 40 |
| Calcium | p. p. m. | 100 |
| Iron | p. p. m. | 4 |
| Manganese | p. p. m. | 4 |
| Zinc | p. p. m. | 2 |
| Copper | p. p. m. | 0.5 |

(Magnesium, calcium, iron, manganese, zinc, and copper were supplied as the chlorides of these metals.)

A series of shake cultures were carried out using various concentrations of phosphorus in the media. In each case the phosphorus was added as phosphoric acid and the medium then adjusted to pH 4.5 by addition of sodium hydroxide. The shake cultures were conducted at 25° C. for 7 days using as inocula, cultures of *Agaricus campestris* (white variety). The results are tabulated below:

| Phosphorus conc. in medium, p. p. m. | Yield of mycelium, g./l. |
|---|---|
| 0 | 0.4 |
| 50 | 6.0 |
| 100 | 23.3 |
| 150 | 23.6 |
| 200 | 24.3 |
| 250 | 24.3 |

EXAMPLE VII

This example shows that it is not necessary to add vitamins to the culture. Further, the example shows that urea is an excellent source of nitrogen and produces yields of mycelium equivalent to those produced by expensive sources of nitrogen such as peptone, yeast extract, and casein hydrolysate.

A series of shake cultures were carried out employing different nitrogen sources. In each case the basic medium contained:

| | |
|---|---|
| Dextrose _____ per cent__ | 7 |
| Phosphorus (supplied as H3PO4) __p. p. m__ | 1000 |
| Potassium (supplied as K2SO4) ___p. p. m__ | 200 |
| Magnesium (supplied as MgCl2) __p. p. m__ | 40 |
| Iron _____ p. p. m__ | 4 |
| Manganese _____ p. p. m__ | 4 |
| Copper _____ p. p. m__ | 0.4 |
| Zinc _____ p. p. m__ | 2 |
| Calcium _____ p. p. m__ | 10 |

To samples of the basic medium were added different nitrogen sources as indicated below. The shake cultures were conducted for 6 days at 25° C. using as inocula, cultures of *Agaricus campestris* (white variety). The following results were obtained:

| Experiment No. | Nitrogen source | Yield of dry mycelium, g./liter |
|---|---|---|
| 1 | urea, 5 g./liter | 19 |
| 2 | urea, 5 g./liter and vitamins [1] | 18 |
| 3 | peptone, 10 g./liter | 23 |
| 4 | yeast extract, 10 g./liter | 20 |
| 5 | amino acid mixture [2] | 23.5 |

[1] Vitamins were added to the medium in such amount as to establish in the medium the following concentrations:

[2] A mixture of amino acids produced by the hydrolysis of casein. This mixture was employed in such amount as to furnish the same nitrogen concentration as 10 g./liter of peptone.

| Vitamin: | Concentration, mg./liter |
|---|---|
| Thiamin | 2 |
| Pyridoxine | 1 |
| Pyridoxamine | 1 |
| Calcium pantothenate | 2 |
| Niacin | 1 |
| Nicotinamide | 1 |
| p-aminobenzoic acid | 0.1 |
| Folic acid | 0.01 |
| Biotin | 0.01 |
| Pyridoxal | 0.4 |
| Inositol | 12.5 |
| Riboflavin | 1 |

EXAMPLE VIII

Samples of mushroom mycelium produced by aerated, agitated submerged culture of *Agaricus campestris* in accordance with this invention were subjected to various preserving treatments:

A. *Freezing.*—A sample of the mycelium was spread in a thin layer on a tray and subjected to flowing steam at atmospheric pressure for about 5 minutes to blanch the mycelium (inactivate the enzymes). The blanched material was then packaged in sealed cans, frozen, and maintained in frozen storage.

B. *Canning.*—A lot of the mycelium was placed in 8-oz. cans, the cans were sealed, then processed at 15 lbs. per sq. in. steam pressure for 20 minutes.

C. *Dehydration.*—A lot of the mycelium was dried on a laboratory double-drum drier having chromium plated rolls 12 inches in diameter. The interior of the rolls were supplied with steam at 30 lbs. per sq. in. and the rotation of the drums was 3 R. P. M. The mycelium was obtained as light brown flakes, having a pleasant odor and taste.

*Recipe for mushroom mycelium cream soup*

2 #1 tall cans of mushroom mycelium (600 grams)
4 qts. milk
½ lb. butter
1 teaspoon onion flakes
3 tablespoons flour
Salt and pepper to taste

*Directions.*—Mix flour with the mushroom mycelium to make a smooth paste, add butter and onion flakes and heat in a double boiler. Cook at a "rolling boil" for 20 minutes. Add milk, salt, and pepper and cook 15 minutes at boiling temperature. Makes 20 servings.

The concentrations of most of the nutrients are given herein as p. p. m. percent of carbohydrate in the medium. The significance of this expression can best be demonstrated by an example, thus: The stated concentration of a nutrient is 200 p. p. m. for each percent of carbohydrate. In making up a medium having 5% carbohydrate sufficient of the nutrient is added to the medium to establish an actual concentration thereof of 5×200, or 1,000 p. p. m. In making up a medium containing 7% carbohydrate then the actual concentration of the nutrient in the medium is 7×200, or 1,400 p. p. m.

Having thus described my invention, I claim:

1. A process for preparing mushroom mycelium having a strong, typical mushroom flavor which comprises culturing mushroom mycelium on a medium comprising water, a carbohydrate nutrient, and a nitrogen nutrient, the nitrogen concentration being at least about 200 p. p. m. for each percent of carbohydrate, in order to obtain high nitrogen content in the mycelium and to accelerate the production of mycelium, while forcing air into the culture beneath the surface thereof at a rate of at least about 0.5 volume per minute per volume of medium and agitating the culture to disperse the air into the culture, continuing the culture under such agitated, aerated, submerged conditions until the carbohydrate source in the medium is substantially completely assimilated thus to obtain rapid and full growth of the mycelium, then aging the resulting culture for several hours at a temperature from about 20° C. to about 35° C. until the mycelium develops a strong, typical mushroom flavor.

2. The process of claim 1 in which the nitrogen nutrient is urea, the nitrogen concentration being from about 300 to 600 p. p. m. for each percent of carbohydrate.

3. The process of claim 1 in which the nitrogen nutrient is urea, the nitrogen concentration being from about 300 to 600 p. p. m. for each percent of carbohydrate, the mineral nutrients phosphorus and potassium being present in a concentration of about 20 to 50 p. p. m. for each percent of carbohydrate, sulfur being present in about 5 to 20 p. p. m., the magnesium about 2 to 10 p. p. m., for each percent of carbohydrate.

4. A process for preparing mushroom mycelium on an aqueous medium while forcing at least about 0.5 volume of air per minute per volume of medium into the culture beneath the surface thereof and agitating the culture to disperse the air into the culture, continuing the culture under such agitated, aerated, submerged conditions until the carbohydrate source in the medium is substantially completely assimilated thus to obtain rapid and full growth of the mycelium, then aging the resulting culture for several hours at a temperature from about 20° C. to about 35° C. until the mycelium develops a strong, typical mushroom flavor.

5. The process of claim 1 wherein the aging is carried out by continuing the incubation under aerated, agitated and submerged conditions.

6. The process of claim 1 wherein the aging is carried out by discontinuing the aeration and agitation and allowing the culture to stand.

7. The process of claim 4 wherein the medium contains the nutrients nitrogen, phosphorus, potassium, sulphur, and magnesium in the following concentrations:

For each percent of carbohydrate in the medium—
N: about 200 to about 600 p. p. m.;
P: about 10 to about 100 p. p. m.;
K: about 10 to about 100 p. p. m.;
S: about 0.5 to about 50 p. p. m.;
Mg: about 0.5 to about 50 p. p. m.;

said medium also containing traces of iron and zinc.

8. The process of preparing mushroom mycelium which comprises culturing the mycelium on an aqueous medium while forcing at least about 0.5 volume of air per minute per volume of medium into the culture beneath the surface thereof and agitating the culture to disperse the air into the culture thus to establish agitated, aerated, submerged conditions of growth, said medium containing urea as the source of nitrogen, the nitrogen concentration being from about 200 to 600 p. p. m. for each percent of carbohydrate.

HARRY HUMFELD.

REFERENCES CITED

The following references are of record in the file of this patent:

UNITED STATES PATENTS

| Number | Name | Date |
| --- | --- | --- |
| Re. 22,202 | Stoller | Oct. 13, 1942 |
| 2,505,811 | Szuecs | May 2, 1950 |

OTHER REFERENCES

Am. J. Botany, vol. 32, pp. 424–431 (July 1945).
Dansk Botanisk Arkiv, vol. 11, No. 6, pp. 30, 31, 57–75, 92–97 (1944).